US011960614B2

(12) United States Patent
Carling et al.

(10) Patent No.: US 11,960,614 B2
(45) Date of Patent: Apr. 16, 2024

(54) SECURE STORAGE OF SENSOR SETTING DATA

(71) Applicant: Fingerprint Cards Anacatum IP AB, Gothenburg (SE)

(72) Inventors: David Carling, Mölndal (SE); Joachim Strömbergson, Sävedalen (SE)

(73) Assignee: Fingerprint Cards Anacatum IP AB, Gothenburg (SE)

( * ) Notice: Subject to any disclaimer, the term of this patent is extended or adjusted under 35 U.S.C. 154(b) by 13 days.

(21) Appl. No.: 17/638,910

(22) PCT Filed: Aug. 31, 2020

(86) PCT No.: PCT/SE2020/050827
§ 371 (c)(1),
(2) Date: Feb. 28, 2022

(87) PCT Pub. No.: WO2021/045664
PCT Pub. Date: Mar. 11, 2021

(65) Prior Publication Data
US 2022/0405408 A1  Dec. 22, 2022

(30) Foreign Application Priority Data
Sep. 4, 2019  (SE) .................................. 1951008-0

(51) Int. Cl.
G06F 21/62      (2013.01)
G06V 40/13     (2022.01)
G06V 40/50     (2022.01)

(52) U.S. Cl.
CPC .............. G06F 21/62 (2013.01); G06V 40/13 (2022.01); G06V 40/50 (2022.01)

(58) Field of Classification Search
CPC .......... G06F 21/62; G06V 40/13; G06V 40/50
See application file for complete search history.

(56) References Cited

U.S. PATENT DOCUMENTS 7,143,314 B2  11/2006 Costin
9,177,153 B1  11/2015 Perrig et al.
(Continued)

OTHER PUBLICATIONS

PCT International Search Report and Written Opinion dated Nov. 23, 2020 for International Application No. PCT/SE2020/050827, 12 pages.

(Continued)

Primary Examiner — Stephen G Sherman
(74) Attorney, Agent, or Firm — RMCK Law Group, PLC

(57) ABSTRACT

The present disclosure relates to a fingerprint sensing system and a method performed by the fingerprint sensing system of verifying that setting data of a fingerprint sensor of the fingerprint sensing system has not been modified. In aspect, a method performed by a fingerprint sensing system of verifying that setting data of a fingerprint sensor of the fingerprint sensing system has not been modified is provided. The method comprises blocking access to the fingerprint sensor setting data held in a storage of the fingerprint sensing system, acquiring from the fingerprint sensor a representation of the fingerprint sensor setting data to be utilized upon capturing a fingerprint image, and verifying from the acquired representation if the fingerprint sensor setting data corresponds to fingerprint sensor setting data that previously was written to the storage.

13 Claims, 7 Drawing Sheets

(56) References Cited

U.S. PATENT DOCUMENTS

| | | |
|---|---|---|
| 10,409,973 B2 * | 9/2019 | Zhou .................... G06F 1/1692 |
| 11,017,202 B2 * | 5/2021 | Kim .................. G06V 40/1347 |
| 2001/0037438 A1 | 11/2001 | Mathis |
| 2005/0138046 A1 | 6/2005 | Miettinen et al. |
| 2008/0114981 A1 | 5/2008 | Hars |
| 2012/0300988 A1 | 11/2012 | Ivanov et al. |
| 2012/0324294 A1 | 12/2012 | Yamada et al. |
| 2015/0199552 A1 | 7/2015 | Du et al. |
| 2015/0379250 A1 | 12/2015 | Saito et al. |
| 2015/0379304 A1 | 12/2015 | Chan et al. |
| 2016/0078274 A1 | 3/2016 | Tuneld et al. |
| 2018/0077369 A1 | 3/2018 | Sun et al. |

OTHER PUBLICATIONS

Sun, Z. et al., "OEI: Operation Execution Integrity for Embedded Devices," arXiv.org, Feb. 9, 2018, Cornell University Library, 201 Olin Library Cornell University Ithaca, NY 14853, Feb. 9, 2018, 16 pages.
Extended European Search Report dated Aug. 12, 2022 for European Application No. 20860655.8, 7 pages.
TCG Mobile Trusted Module, Specification Version 1.0, Revision 7.02, Apr. 29, 2010, http://www.trustedcomputinggroup.org/files/static_page_files/3D843B67-1A4B294-D0B5B407C36F4B1D/Revision_7.02-_29April2010-tcg-mobile-trusted-module-1.0.pdf, retrieved Jan. 15, 2015, 103 pages.

* cited by examiner

SECURE STORAGE OF SENSOR SETTING DATA

CROSS-REFERENCE TO RELATED APPLICATIONS

This application is a 371 U.S. National Stage of International Application No. PCT/SE2020/050827, filed Aug. 31, 2020, which claims priority to Swedish Patent Application No. 1951008-0, filed Sep. 4, 2019. The disclosures of each of the above applications are incorporated herein by reference in their entirety.

TECHNICAL FIELD

The present disclosure relates to a fingerprint sensing system and a method performed by the fingerprint sensing system of verifying that setting data of a fingerprint sensor of the fingerprint sensing system has not been modified.

BACKGROUND

In current fingerprint sensing systems, fingerprint sensor setting data such as analog-to-digital converter (ADC) gain, ADC shift, pixel gain, etc., are sent to the sensor in the clear from a host (smart phone, tablet, smart card, etc.) in which the sensor is implemented, i.e. without any security provided to protect the setting data sent to the sensor. Therefore, it may be possible to modify the sensor settings written by the host before an image capture command is sent or during the image capture process itself.

Hence, the captured fingerprint image may be altered by a malicious third party by altering the sensor settings on the fly while the image is being captured in order to create a modified finger print image. Worst case, an image may be manipulated by altering the sensor settings to have the host incorrectly authenticate a fingerprint.

SUMMARY

An object is to solve, or at least mitigate, this problem in the art and thus to provide a method performed by a fingerprint sensing system of verifying that setting data of a fingerprint sensor of the fingerprint sensing system has not been modified.

In a first aspect, a method performed by a fingerprint sensing system of verifying that setting data of a fingerprint sensor of the fingerprint sensing system has not been modified is provided. The method comprises blocking access to the fingerprint sensor setting data held in a storage of the fingerprint sensing system, acquiring from the fingerprint sensor a representation of the fingerprint sensor setting data to be utilized upon capturing a fingerprint image, and verifying from the acquired representation if the fingerprint sensor setting data corresponds to fingerprint sensor setting data that previously was written to the storage.

In a second aspect, a fingerprint sensing system comprising a fingerprint sensor and a processing unit is provided, the fingerprint sensing system being configured to verify that fingerprint sensor setting data held in a storage of the fingerprint sensing system has not been modified. The processing unit is configured to block access to the fingerprint sensor setting data held in the storage of the fingerprint sensing system, acquire from the fingerprint sensor a representation of the fingerprint sensor setting data to be utilized upon capturing a fingerprint image, and to verify from the acquired representation if the fingerprint sensor setting data corresponds to fingerprint sensor setting data that previously was written to the storage by the processing unit.

To mitigate or even avoid the risk of sensitive fingerprint sensor setting data being manipulated, access to a storage containing the sensor setting data being critical from an image capture point of view is blocked, thereby preventing the sensor setting data from being modified when an image capture command is sent from the processing unit—commonly being referred to a host processor—to the sensor.

Hence, sensor setting data to be used by the fingerprint sensor, and which data is sensitive in terms of potential manipulation of a captured image, is held in a memory of the sensor. When a fingerprint image is to be captured, access to the fingerprint sensor setting data held in the memory of the fingerprint sensing system is blocked. This is for instance undertaken by having the host processor (or the fingerprint sensor) preventing data writes to the memory, or at least to a part of the memory holding the sensitive sensor setting data. This ensures that the sensor settings are not altered during image capture and readout. For instance, as soon as the host processor sends an image capture command to the sensor, the sensor may block access to the memory holding the sensitive sensor setting data.

Before or after the sensor captures an image, the host processor acquires a secure representation of the sensor setting data held in the memory and verifies if the sensor setting data held in the memory corresponds to the sensor setting data that previously was written by the host processor to the memory. For instance, the sensor sends the sensor setting data that was utilized in case an image already has been captured, or the sensor setting data which is to be utilized in case the image has not yet been captured, to the host processor. Thereafter, the two sets of sensor setting data are compared to each other (or two subsets of the data are compared to each other), and if the two sets are identical, the host processor will advantageously conclude that the sensor setting data in the sensor memory has not been modified.

In an embodiment, in case it is verified from the representation that the fingerprint sensor setting data to be used when capturing an image indeed corresponds to fingerprint sensor setting data that previously was written to the storage, a fingerprint image is captured with the fingerprint sensor utilizing the fingerprint sensor setting data in the storage.

In an embodiment, a fingerprint image is captured with the fingerprint sensor utilizing the fingerprint sensor setting data in the storage, and in case the fingerprint sensor setting data does not correspond to fingerprint sensor setting data that previously was written to the storage, the captured image is discarded.

In a further embodiment, in case an image not yet has been captured, the image capture process may be discontinued in case the fingerprint sensor setting data received from the sensor does not correspond to the fingerprint sensor setting data that previously was written to the storage.

In an embodiment, access to the fingerprint sensor setting data held in the storage of the fingerprint sensing system is unblocked.

In an embodiment, the acquired representation comprises a checksum computed by the sensor based on the fingerprint sensor setting data held in the storage, and a further checksum is computed by the host processor based on fingerprint sensor setting data that previously was written to the storage, wherein the verification is successful if the two checksums match. If the representation of the sensor setting data is provided with an indication of authenticity and data integrity—in the form of for instance an appropriate checksum—level of security is greatly increased for the verification process.

Further embodiments will be described in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
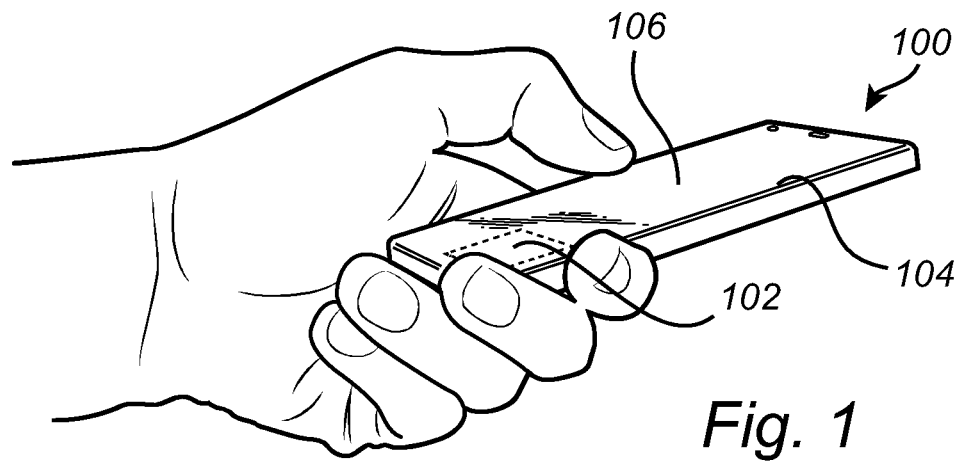
FIG. 1 shows an electronic host device in the form of a smart phone in which the present invention may be implemented.

FIG. 1 shows an electronic host device in the form of a smart phone 100 in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, smartwatches, etc., or any other type of present or future similarly configured device utilizing fingerprint sensing.

Figure 2:
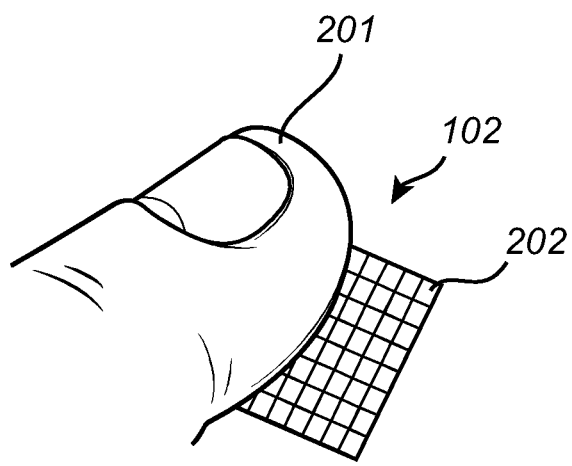
FIG. 2 shows a view of a fingerprint sensor onto which a user places the finger.

FIG. 2 illustrates a somewhat enlarged view of the fingerprint sensor 102 onto which a user places her finger 201. The fingerprint sensor 102 is configured to comprise a plurality of sensing elements. A single sensing element (also denoted as a pixel) is in FIG. 2 indicated by reference numeral 202.

Figure 3:
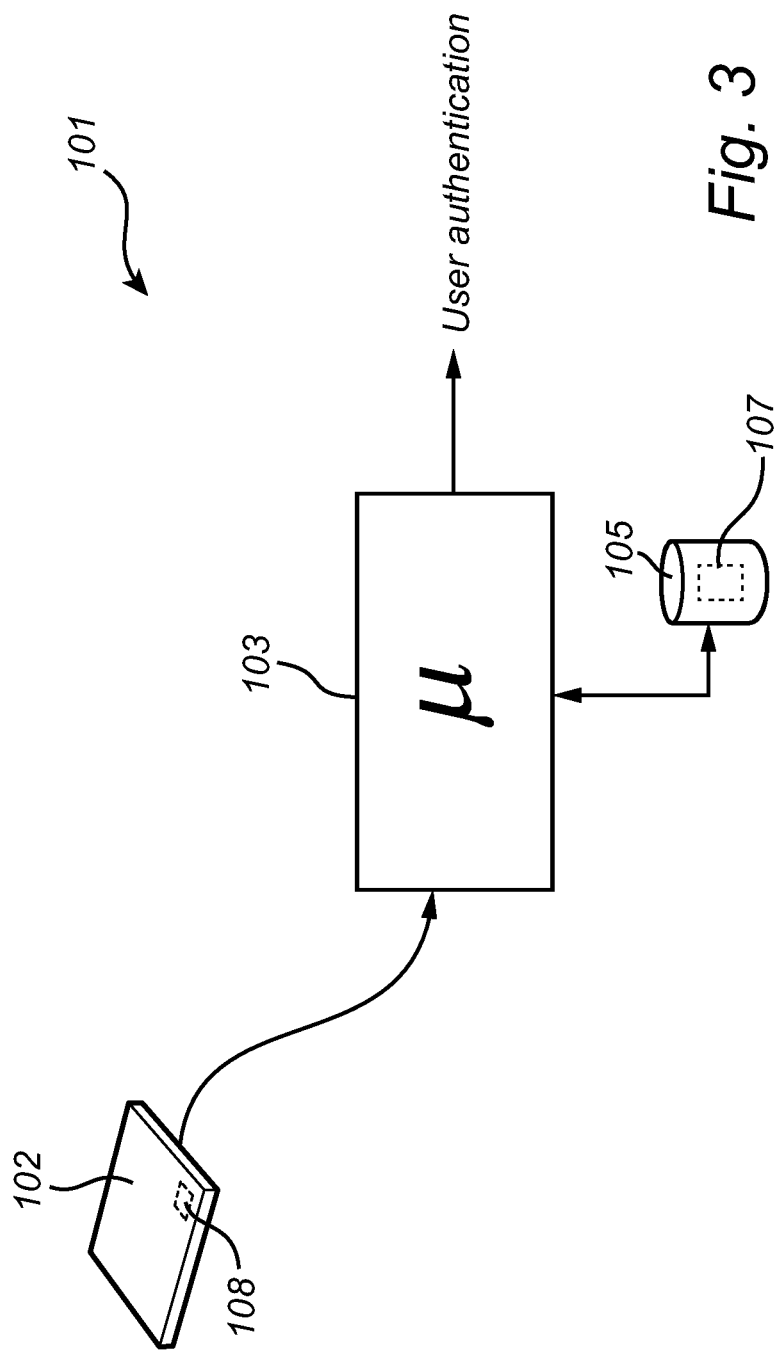
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1. A local memory 108 such as a one-time programmable (OTP) memory, flash memory, or random-access memory (RAM) may be embedded in the sensor die. It is noted that the fingerprint sensor 102 is equipped with data processing capability but is far less powerful in terms of processing power as compared to the processing unit 103 (commonly referred to as the host processor).

Now upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology.

In a general authorization process, the user places her finger 201 on the display surface 104 arranged above the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 are in practice performed by the processing unit 103 embodied in the form of one or more microprocessors arranged to execute a computer program 107 downloaded to the storage medium 105 associated with the microprocessor, such as a RAM, a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102. One or more steps may also be performed by the fingerprint sensor 102 which, as previously mentioned, is capable of performing data processing.

Now, as previously discussed, fingerprint sensor setting data may be manipulated by a malicious third party in order to spoof the fingerprint sensing system. Fingerprint sensor setting data may include, but is not limited to, one or more of pixel offset/gain, pixel charge subtraction, ADC offset/gain/shift, digital sample gain/offset, digital/analog multi-sampling, frequency control, clock control, bias control, sampling pattern, demodulation pattern, test modes, swinging pixel guard pattern, correlated sampling on/off, etc. Further included could be sensor settings for producing noise information from which random value data to be used in cryptographic functions is generated. All sensor setting data sent to the fingerprint sensors/image capture function which may affect image data being output from the sensor may be considered sensitive and could thus be blocked from being accessed, and possibly also part of a computed checksum. Many different types of sensor setting data may be envisaged.

A solution to the problem of potentially having the sensor setting data being manipulated could be to protect the sensor settings from being tampered with using for instance using cryptography. However, such operations are generally processing-heavy and add latency to the system. This is particularly troublesome in case the host is a device with relatively scarce processing capability, for instance a smartcard. Providing security such as cryptographic authentication, integrity, confidentiality and replay protection to all transactions between the sensor 102 and the host processor 103 would be too costly in terms of system performance for a device 100 such as a smartcard. Therefore, it has been decided in smartcard fingerprint sensor systems that security only shall be applied to image data read from the sensor. This will keep the system transaction latency to a minimum between the sensor 102 and the host processor 103.

However, the problem still remains that the fingerprint sensor setting data is at risk of being manipulated, which ultimately could lead to the fingerprint image being manipulated for instance with the attempt of spoofing the system.

Embodiments solve this problem by blocking access to a storage containing sensor setting data which is critical from an image capture point of view, thereby preventing the sensor setting data from being modified. For instance, the sensor settings data may be stored in local memory 108 or in storage medium 105.

Figure 4:
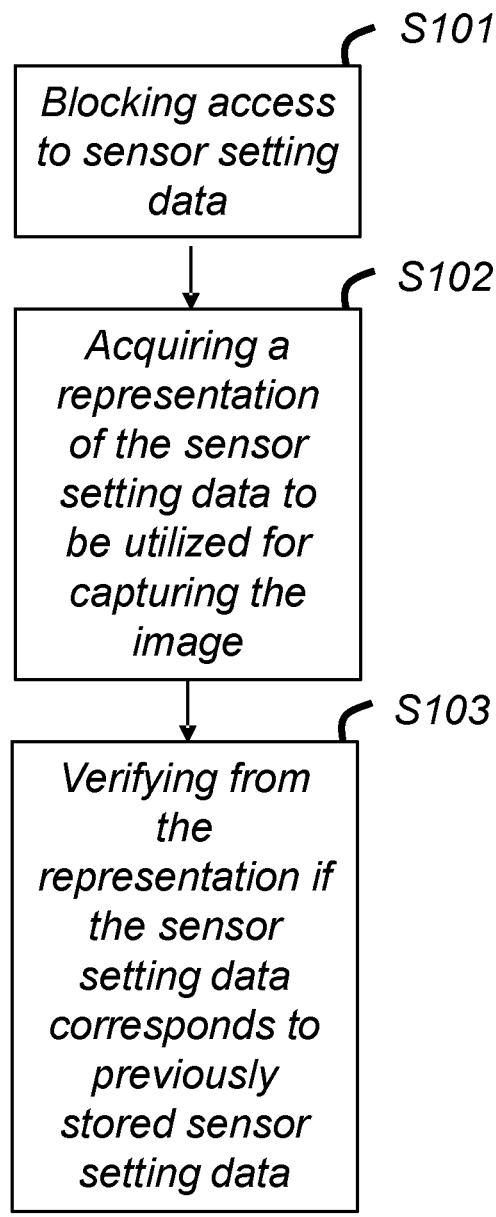
FIG. 4 shows a flowchart illustrating an embodiment of a method performed by the fingerprint sensing system of verifying that setting data of the fingerprint sensor has not been modified.

FIG. 4 shows a flowchart illustrating an embodiment of a method performed by the fingerprint sensing system 101 of verifying that setting data of the fingerprint sensor 102 has not been modified.

Hence, sensor setting data which potentially may be modified by a malicious party for manipulating a captured image may be held in memory 108. The sensor setting data is typically written to the memory 108 by the host processor 103.

In a first step S101, access to fingerprint sensor setting data held in the memory 108 of the fingerprint sensing system 101 is blocked. This is for instance undertaken by having the host processor 103 writing to a read/write port of the memory 108, thereby preventing data writes to the memory 108, or at least to a part of the memory 108 holding the sensitive sensor setting data. Alternatively, a blocking command is sent from the host processor 103 to the sensor 102, which itself blocks access to the memory 108 upon receiving the blocking command.

This ensures that the sensor settings are not altered during image capture and readout. It is envisaged that verification of the sensor setting data is performed either before or after an image has been captured, and both alternatives will be discussed in the following starting with a scenario where verification is performed before an image is captured.

Before the sensor 102 is instructed to capture an image (but after access to the sensor setting data has been blocked), the host processor 103 acquires in step S102 a representation of the sensor setting data held in the memory 108, for instance by the sensor 102 sending the sensor setting data to be utilized for image capture, and verifies in step S103 if the sensor setting data held in the memory 108 and thus communicated by the sensor 102 corresponds to the sensor setting data that previously was written by the host processor 103 to the memory 108 (and which also is held in host memory 105). In this embodiment, the two sets of sensor setting data are compared to each other (or two subsets of the data are compared to each other), and it the two sets are identical, the host processor 103 will advantageously conclude that the sensor setting data in the memory 108 has not been modified.

Advantageously, by blocking access to the sensor setting data held in the memory 108, a malicious party is hampered from modifying the sensor setting data to manipulate a subsequently captured image.

Figure 5:
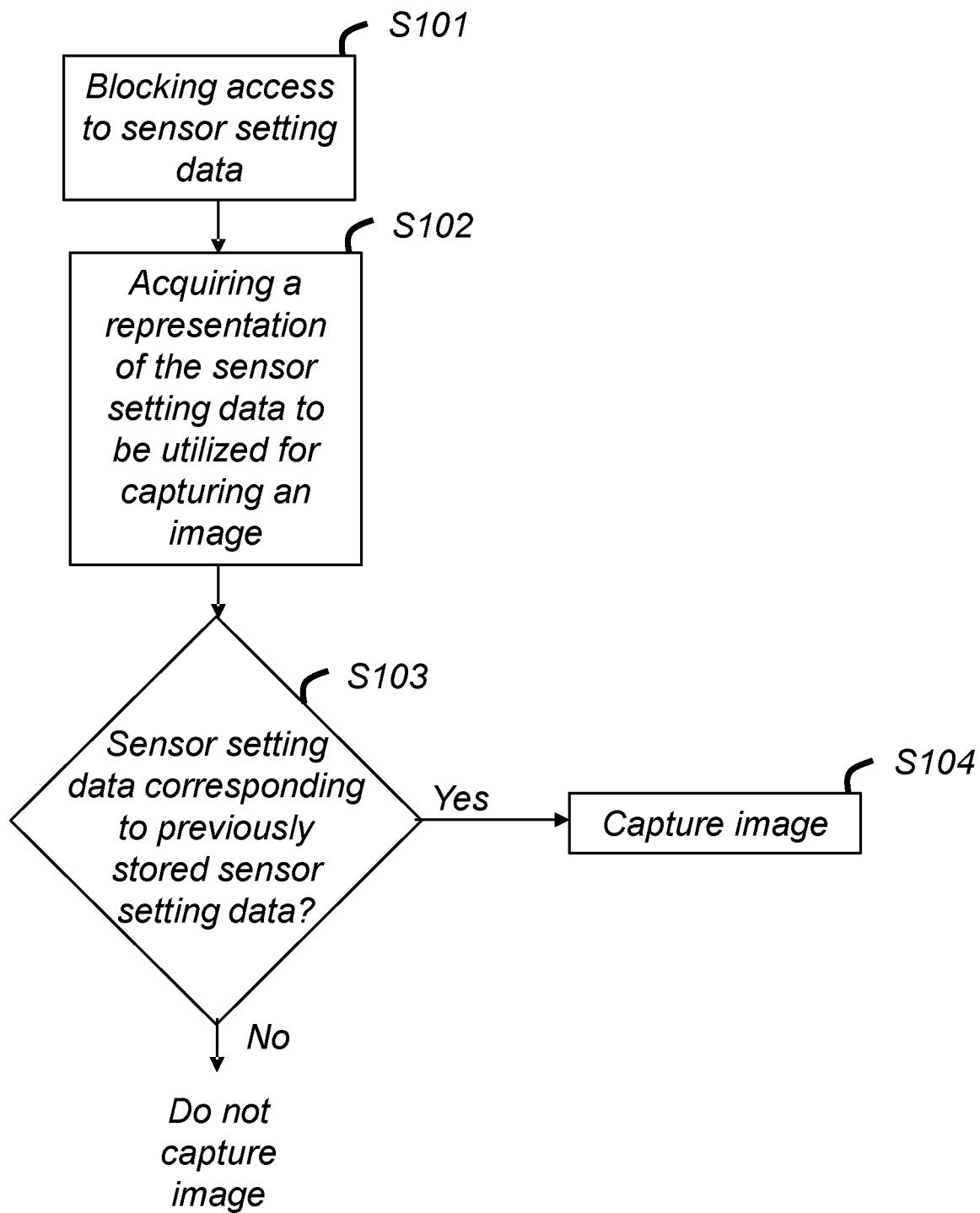
FIG. 5 shows a flowchart illustrating a further embodiment of a method performed by the fingerprint sensing system of verifying that setting data of the fingerprint sensor has not been modified.

FIG. 5 shows a flowchart illustrating an embodiment of the method performed by the fingerprint sensing system 101 of verifying that setting data of the fingerprint sensor 102 has not been modified, wherein in case it is verified in step S103 that the sensor setting data held in the memory 108 corresponds to the sensor setting data that previously was written by the host processor 103 to the memory 108, the sensor 102 will indeed capture an image in step S104 using the sensor setting data held in the memory 108.

If not, no image will be captured since an indication has been given that the sensor setting data in the memory 108 has been modified, and thus that a captured image potentially has been manipulated.

The image is thus captured with a given—i.e. locked—sensor setting held in the memory 108. After the complete image has been readout be the processor 103 from the sensor 102, the lock is removed from the registers thereby allowing access to the sensor setting data in the memory 108.

Since the host processor 103 knows which sensor setting data it has written to the sensor 102, the processor 103 can validate the sensor settings when verifying that the sensor setting data provided by the sensor 102 actually was the data that was written to the memory 108 before the image was captured.

This ensures that the sensor settings has not been altered. If any modification has been done, it will be discovered during the verification performed by the host processor 103 in step S103.

Figure 6:
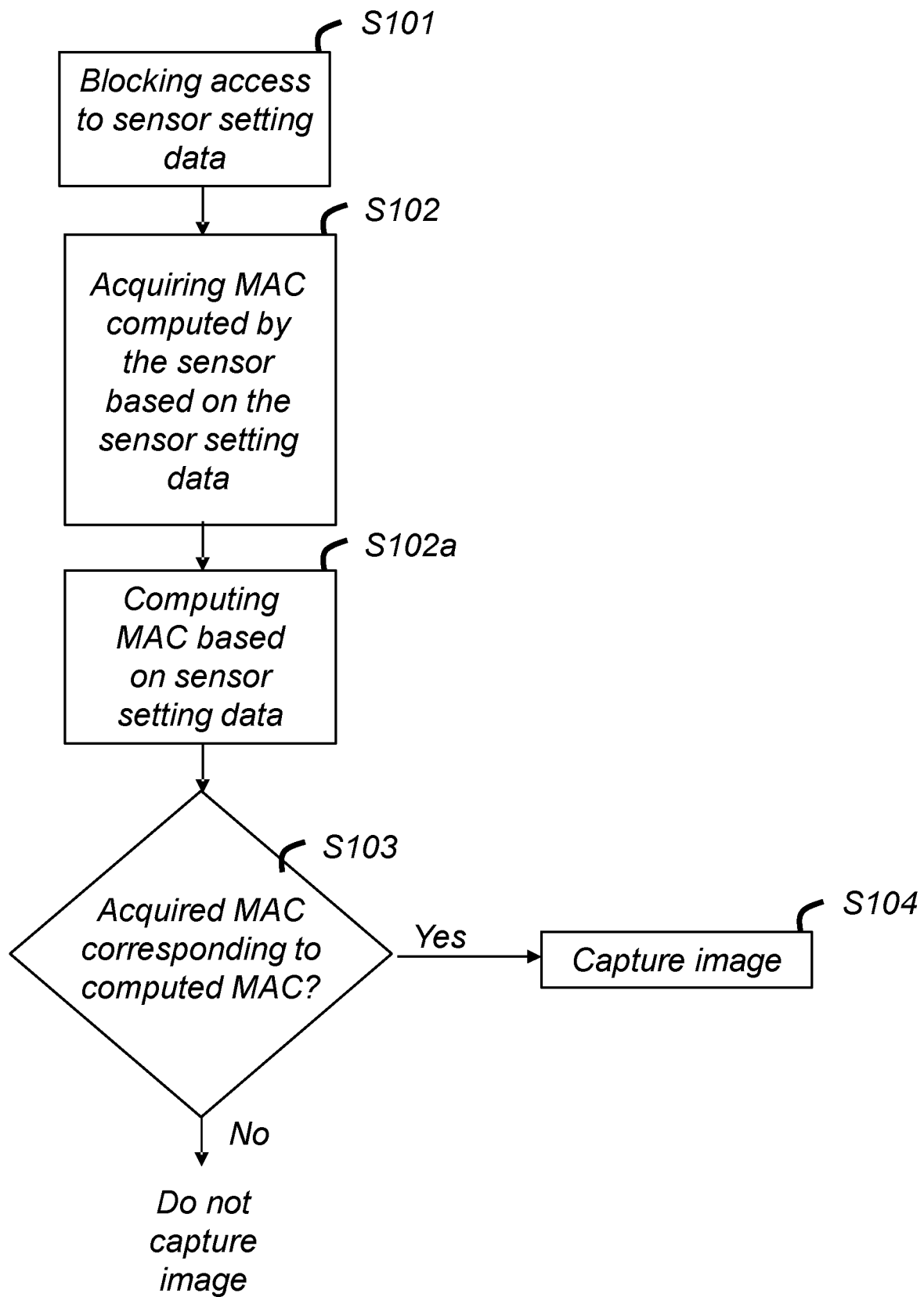
FIG. 6 shows a flowchart illustrating an embodiment of a method performed by the fingerprint sensing system

FIG. 6 shows a flowchart illustrating a further embodiment of the method performed by the fingerprint sensing system 101 of verifying that setting data of the fingerprint sensor 102 has not been modified.

To further enhance security of the process of verifying that the sensor setting data has not been modified, the sensor 102 will after having blocked access to the memory 108 in step S101 provide the representation of the sensor setting data with an indication of authenticity, thereby indicating that the representation originates from a trusted sender, in this case the sensor 102. This may be achieved by processing the sensor setting data with a secret symmetric key shared between the sensor 102 and the host processor 103, or by digitally signing the sensor setting data.

For instance, the sensor setting data may be processed at the sensor 102 by computing a checksum such as a Message Authentication Code (MAC) using for example a Cipher-based MAC (CMAC) algorithm based on the sensor setting data and a shared secret key. As another option, a hashed MAC (HMAC) secure hash algorithm (SHA) may be utilized or a SipHash algorithm. Any Advanced Encryption Standard (AES) algorithm may be utilized at the sensor 102 using the sensor setting data as input to provide the representation with confidentiality including AES-GCM ("Galois/Counter Mode") and AES-OBC ("Offset Codebook Mode").

The computation of a MAC has the further advantage that not only is an indication of authenticity provided to the representation—i.e. the output of the CMAC algorithm using the sensor setting data as input—but an indication of data integrity is additionally provided. Hence, by computing a MAC, not only does the representation indicate that it originates from a trusted sender, it further indicates whether or not any changes have been made to the representation (and thus the sensor setting data). Hence, computation of a checksum indicating authenticity and data integrity, e.g. utilizing an algorithm such as a CMAC or HMAC, to a receiver of the checksum is highly advantageous. The receiver, in this case the host processor 103, has access to the sensor setting data on which the checksum is based and can thus accordingly compute its own checksum for comparison with the acquired checksum.

The host processor 103 will thus receive the MAC in step S102 having been computed by the sensor 102 and will thereafter fetch (from the memory 105) the sensor setting data previously sent to the sensor, Again, the host processor 103 must determine in step S103 whether or not the sensor setting data to be used for capturing an image is the same as the sensor data previously transferred to the sensor 102 (and stored in currently blocked memory 108).

In this particular embodiment, the host processor 103 fetches the sensor setting data from the memory 105 and computes a MAC using the same algorithm as the sensor 102 with the secret shared key using the fetched sensor setting data as input in step S102a.

In step S103, the MAC computed by the host processor 103 in step S102a is compared to the MAC acquired by the host processor 103 in step S102. If the two corresponds, the verification is successful and the fingerprint sensor 102 will be instructed by the host processor 103 to capture an image in step S104.

It is noted that it is not necessary for the host processor 103 to perform a processing-heavy decryption operation on the acquired MAC to verify that the sensor setting data on which the MAC is based has not been modified. The MAC is generated in the same way at both the sensor 102 and the host processor 103.

Figure 7:
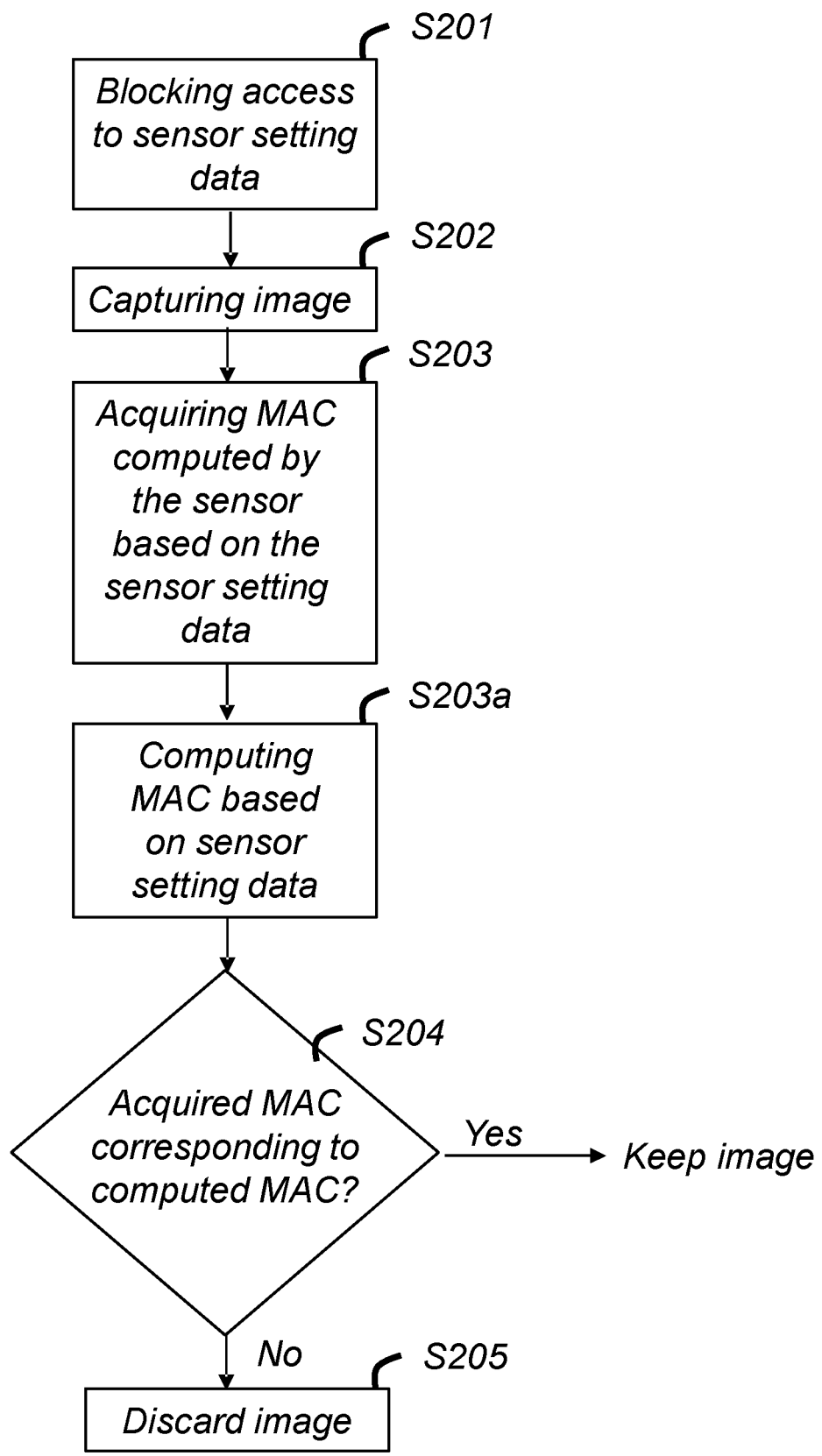
FIG. 7 shows a flowchart illustrating another embodiment of a method performed by the fingerprint sensing system of verifying that setting data of the fingerprint sensor has not been modified.

FIG. 7 shows a flowchart illustrating an embodiment of the method performed by the fingerprint sensing system 101 of verifying that setting data of the fingerprint sensor 102 has not been modified, where an image is captured before the verification is performed.

In a first step S201, access to fingerprint sensor setting data held in the memory 108 of the fingerprint sensing system 101 is blocked as previously described.

Thereafter, in step S202, the sensor 102 captures an image of the finger contacting the sensor 102 utilizing the current sensor setting data stored in the memory 108. The image is thus captured with a locked sensor setting. After the complete image has been readout the lock may be removed from these memory registers thereby allowing access to the sensor setting data in the memory 108.

The sensor setting data that was utilized upon capturing the image is then acquired in step S203. As has been discussed previously with reference to FIG. 6, the sensor may compute a MAC using any appropriate algorithm and provide the computed MAC to the host processor 103 in step S203.

Since the host processor 103 knows which sensor setting data it has written to the sensor 102, the processor 103 can verify the sensor settings by fetching the sensor setting data from the memory 105 and compute a MAC in step S203a with the fetched sensor setting data as input using the same algorithm and the shared secret key that previously was used by the sensor 102.

Thereafter, the host processor 103 verifies in step S204 the sensor setting data by comparing the computed MAC with the MAC acquired from the sensor 102, and if the two MACs are the same, verification is successful.

If so, the captured image is kept and the process continues, for instance by finalizing a transaction in case the host is a credit card. If not, i.e. if any modification of the sensor setting data has been undertaken, the two MACs will not match, and the captured image is discarded in step S205.

Figure 8:
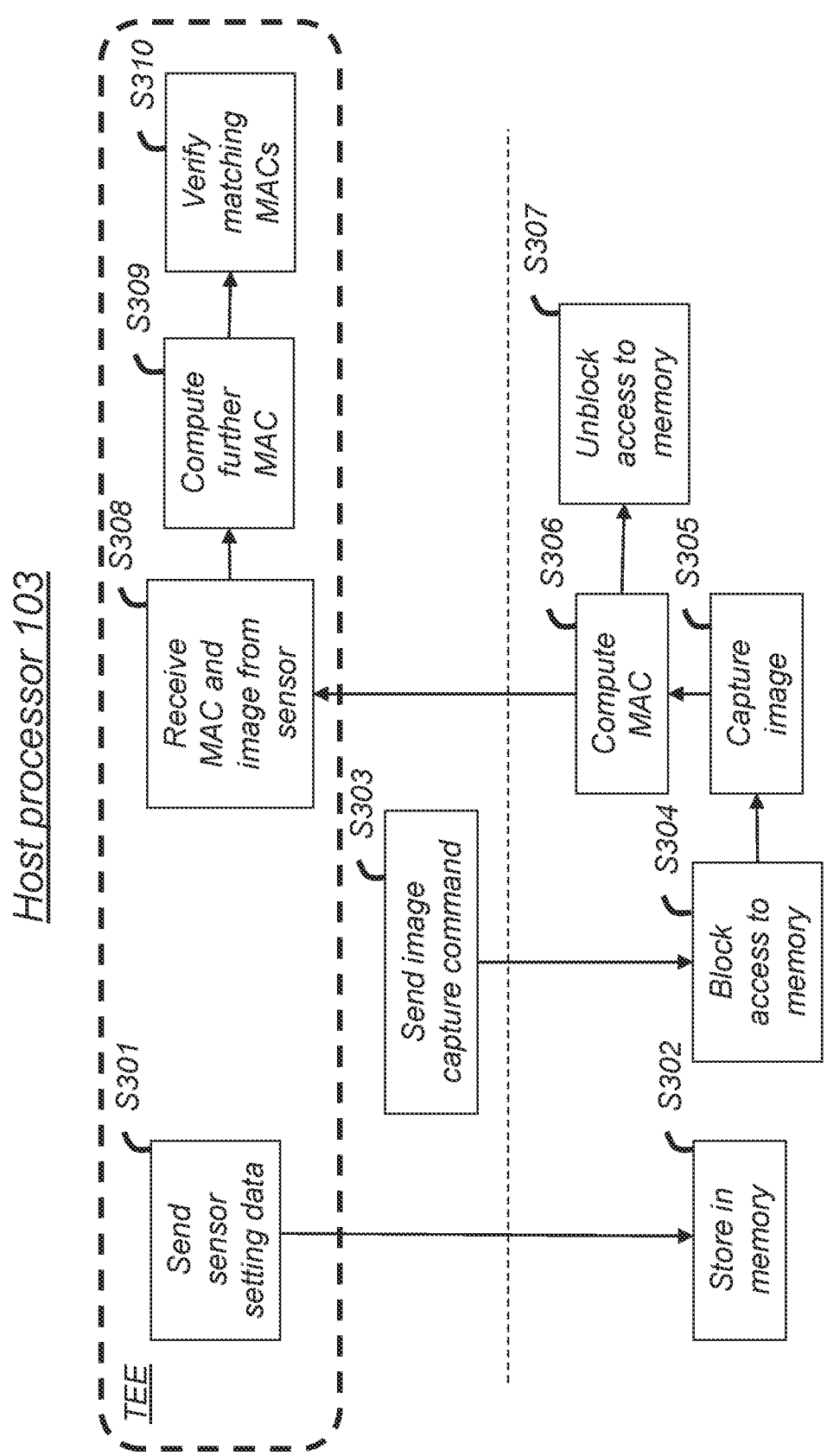
FIG. 8 shows a signalling diagram between the host processor and the fingerprint sensor according to an embodiment.

FIG. 8 shows a signalling diagram illustrating in detail how communication between the host 100 (i.e. the host processor 103) and the fingerprint sensor 102 in practice may be undertaken according to an embodiment.

In a first step S301, sensor setting data held in the memory 105 of the host device 100 is sent by the host processor 103 to the sensor 102. Data handled by the host processor 103 may be processed within a so-called Trusted Execution Environment (TEE) of the host 100, in order to ensure secure processing. The sensor 102 stores the received sensor setting data in the memory 108 as illustrated by the step S302. The sensor 102 thus has access to the sensor setting data to be utilized upon subsequently capturing a fingerprint image.

In step S303, the host process 103 sends an image capture command to the sensor 102. As illustrated in step S304, the access to the sensor settings data stored in the sensor memory 108 in step S302 is blocked, such that the stored sensor setting data cannot be modified by a malicious party. The sensor 102 may be configured to block access to the sensor memory 108 as soon as the sensor 102 receives an image capture command. It should be noted that the host processor 103 may send the sensor setting data and the image capture command in a single instruction, whereupon the sensor 102 stores the received sensor setting data and blocks access to the memory 108 (or at least the part of the memory 108 comprising the sensor setting data).

The fingerprint sensor 102 will capture an image of a finger contacting the sensor in step S305, as instructed by the host processor 103 with the image capture command of step S303.

In step S306, the sensor 102 computes a MAC as previously has been described based on the stored sensor settings data. It is noted that the MAC may be computed based on a combination—e.g. a concatenation—of the sensor setting data and the captured image data. Moreover, the image may optionally be encrypted using any one of the previously mentioned encryption algorithms.

The sensor 102 may at this stage, after the captured image has been fully read out, unblock the access to the sensor settings data stored in the sensor memory 108 as illustrated in step S307 such that the sensor settings data held in the memory 108 again can be accessed. The host processor 103 receives the captured (optionally encrypted) image data and the computed MAC in step S308 and stores the received data in the host memory 105.

Finally, the host process 103 acquires, from the host memory 105, the sensor setting data that was originally sent to the sensor 102 in step S301 and computes a corresponding MAC (possibly also using image data if image data was used by the sensor 102 upon computation of the MAC, and thus also decrypting any encrypted image data) in step S309. This computed MAC is compared to the MAC received in step S310, and if the two MACs match, the host processor 103 has verified that the sensor settings data utilized upon image capture has not been modified.

It may further be envisaged that the access to the sensor memory 108 not is unblocked until the host processor 103 sends an unblock command (not shown) to the sensor 102 upon having performed successful MAC verification, whereupon the sensor 102 would perform the access unblock operation as illustrated in step S307.

As is understood, a reset or abort command (for instance initiated by the host processor 103) may terminate the image capture procedure and unblock the access to the sensor setting data in the sensor memory 108.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method performed by a fingerprint sensing system of verifying that setting data of a fingerprint sensor of the fingerprint sensing system has not been modified, comprising:
   blocking, upon receiving a fingerprint image capture command, access to the fingerprint sensor setting data held in a storage of the fingerprint sensing system;
   subsequent to blocking access to the fingerprint sensor setting data, acquiring, from the fingerprint sensor, a representation of the fingerprint sensor setting data to be utilized upon capturing a fingerprint image;
   verifying from the acquired representation if the fingerprint sensor setting data corresponds to fingerprint sensor setting data that previously was written to the storage; and
   when a captured image is read out, unblocking access to the fingerprint sensor setting data held in the storage of the fingerprint sensing system.

2. The method of claim 1, further comprising, in case it is verified from the representation that the fingerprint sensor setting data corresponds to fingerprint sensor setting data that previously was written to the storage:
   capturing a fingerprint image with the fingerprint sensor utilizing the fingerprint sensor setting data in the storage.

3. The method of claim 1, further comprising:
   capturing a fingerprint image with the fingerprint sensor utilizing the fingerprint sensor setting data in the storage, and in case the fingerprint sensor setting data does not correspond to fingerprint sensor setting data that previously was written to the storage:
   discarding the captured image.

4. The method of claim 1, the representation having been provided with an indication of authenticity and data integrity by the fingerprint sensor, the verification comprising:
   verifying that the indication of authenticity indicates that the representation originates from the fingerprint sensor and that the indication of data integrity indicates that the representation has not been modified.

5. The method of claim 4, wherein the acquired representation comprises a checksum based on the fingerprint sensor setting data held in the storage, the method further comprising:
   computing a further checksum based on fingerprint sensor setting data that previously was written to the storage, wherein the verification is successful if the two checksums match.

6. The method of claim 1, wherein the fingerprint sensor setting data includes one or more of analog-to-digital converter, ADC, gain, ADC shift, ADC offset, pixel gain, pixel offset, pixel charge subtraction, digital sample gain, digital sample offset, digital/analog multisampling, frequency control, clock control, bias control, sampling pattern, demodulation pattern, test modes, swinging pixel guard pattern, correlated sampling on/off.

7. A computer program product comprising a non-transitory computer readable medium storing computer-executable instructions that, when executed by one or more processors of a fingerprint sensing system, cause the fingerprint sensing system to perform the method of claim 1.

8. A fingerprint sensing system comprising a fingerprint sensor and at least one processor, the fingerprint sensing system being configured to verify that fingerprint sensor setting data held in a storage of the fingerprint sensing system has not been modified, the at least one processor being configured to:
   block access to the fingerprint sensor setting data held in the storage of the fingerprint sensing system;
   subsequent to blocking access to the fingerprint sensor setting data, acquire, from the fingerprint sensor, a representation of the fingerprint sensor setting data to be utilized upon capturing a fingerprint image;
   verify from the acquired representation if the fingerprint sensor setting data corresponds to fingerprint sensor setting data that previously was written to the storage by the unit at least one processor; and
   when a captured image is read out, unblock access to the fingerprint sensor setting data held in the storage of the fingerprint sensing system.

9. The fingerprint sensing system of claim 8, the at least one processor further being configured to, in case it is verified from the representation that the fingerprint sensor setting data corresponds to fingerprint sensor setting data that previously was written to the storage:

control the fingerprint sensor to capture a fingerprint image utilizing the fingerprint sensor setting data in the storage.

10. The fingerprint sensing system of claim 8, the fingerprint sensor further being configured to:

capture a fingerprint image utilizing the fingerprint sensor setting data in the storage, and in case the fingerprint sensor setting data does not correspond to fingerprint sensor setting data that previously was written to the storage the at least one processor is further configured to:

discard the captured image.

11. The fingerprint sensing system of claim 8, the fingerprint sensor being configured to provide the representation with an indication of authenticity and data integrity, wherein the at least one processor further is configured to, upon performing the verification:

verify that the indication of authenticity indicates that the representation originates from the fingerprint sensor and that the indication of data integrity indicates that the representation has not been modified.

12. The fingerprint sensing system of claim 11, wherein the acquired representation comprises a checksum based on the fingerprint sensor setting data held in the storage, the at least one processor being configured to:

compute a further checksum based on fingerprint sensor setting data that previously was written to the storage, wherein the verification is successful if the two checksums match.

13. An electronic device comprising the fingerprint sensing system of claim 8.

\* \* \* \* \*